(12) United States Patent
Carnes, III et al.

(10) Patent No.: US 12,047,374 B2
(45) Date of Patent: Jul. 23, 2024

(54) PREVENTING NETWORK DISCOVERY BY UNTRUSTED DEVICES

(71) Applicant: Ciena Corporation, Hanover, MD (US)

(72) Inventors: James P'ford't Carnes, III, Baltimore, MD (US); David Jordan Krauss, Centreville, VA (US); Kyle Gosselin-Harris, Greenacres, WA (US)

(73) Assignee: Ciena Corporation, Hanover, MD (US)

( * ) Notice: Subject to any disclaimer, the term of this patent is extended or adjusted under 35 U.S.C. 154(b) by 272 days.

(21) Appl. No.: 17/197,634

(22) Filed: Mar. 10, 2021

(65) Prior Publication Data

US 2022/0294781 A1 Sep. 15, 2022

(51) Int. Cl.
*H04L 9/40* (2022.01)
*H04L 61/103* (2022.01)
*H04L 101/622* (2022.01)

(52) U.S. Cl.
CPC ........ *H04L 63/0876* (2013.01); *H04L 61/103* (2013.01); *H04L 63/0236* (2013.01); *H04L 63/102* (2013.01); *H04L 63/1491* (2013.01); *H04L 63/20* (2013.01); *H04L 2101/622* (2022.05)

(58) Field of Classification Search
CPC ............... H04L 63/0876; H04L 63/102; H04L 63/0236; H04L 63/1491; H04L 63/20; H04L 61/103; H04L 61/58; H04L 2101/622

See application file for complete search history.

(56) References Cited

U.S. PATENT DOCUMENTS

| | | | |
|---|---|---|---|
| 7,506,360 B1* | 3/2009 | Wilkinson | H04L 63/1433 709/224 |
| 8,800,025 B2* | 8/2014 | Fung | H04L 63/102 718/1 |
| 9,148,428 B1* | 9/2015 | Banga | H04L 63/1425 |
| 9,203,746 B2 | 12/2015 | Gilson et al. | |
| 9,860,164 B2 | 1/2018 | Jilani et al. | |
| 10,608,954 B2 | 3/2020 | Gosselin-Harris et al. | |
| 2010/0027551 A1* | 2/2010 | Arkin | H04L 61/103 370/400 |

(Continued)

*Primary Examiner* — Khoi V Le
(74) *Attorney, Agent, or Firm* — Baratta Law PLLC; Lawrence A. Baratta, Jr.

(57) ABSTRACT

Systems, methods, and computer-readable media are provided for protecting a network from network discovery by an unknown or unauthenticated device. A network element, according to one implementation, is arranged in a communication network and includes an interface device configured to enable communication with an unknown network device. The network element also includes a memory system configured to store first and second sets of network information. The first set of network information includes fake information about the network and is configured to deceive the unknown network device before a procedure is performed for analyzing the authentication of the unknown network device. The second set of network information includes real information about the network. In some cases, the first set of network information may be provided to the unknown network device via the interface device before performing the procedure for analyzing the authentication of the unknown network device.

16 Claims, 7 Drawing Sheets

(56) References Cited

U.S. PATENT DOCUMENTS

| | | | |
|---|---|---|---|
| 2014/0115652 A1* | 4/2014 | Kapoor | H04L 63/10 |
| | | | 726/1 |
| 2018/0359244 A1* | 12/2018 | Cockerill | H04L 63/0823 |
| 2019/0020676 A1* | 1/2019 | Laughlin | G06N 20/00 |
| 2019/0268350 A1* | 8/2019 | Salkini | H04W 64/00 |
| 2020/0162364 A1 | 5/2020 | Chhabra et al. | |

* cited by examiner

PREVENTING NETWORK DISCOVERY BY UNTRUSTED DEVICES

TECHNICAL FIELD

The present disclosure generally relates to networking systems and methods. More particularly, the present disclosure relates to protecting a network from malicious activity by preventing network discovery by unknown, untrusted, or unauthenticated network devices.

BACKGROUND

Generally, communication networks are designed with various types of protection components (hardware and software) for protecting the networks from malicious attacks by nefarious, adversarial actors. Enumeration of assets and the discovery of network devices are often the first actions by a malicious attacker against a network. Thus, for the safe operation of a network, it would be beneficial to include specific ways to prevent enumeration or discovery by malicious devices.

These attacks usually begin by a device attaching to a network and then immediately building a cache of devices and targets by simply listening to Address Resolution Protocol (ARP) announcements. Other Layer 2 broadcasts that occur within the network further enrich the data that the malicious device collects. This breach of security can occur because existing network elements often implicitly trust other end-point devices and pass this information to whatever device is connecting the end-point to the network.

In some conventional systems, port security (e.g., MAC filtering) and 802.1X authentication include mechanisms that attempt to mitigate this risk. However, port security can be easily defeated. For example, port security is typically enabled by pre-registering and approving MAC addresses with an interface, and then, by simply faking a MAC address, it can be possible to bypass this security control entirely. Also, 802.1X solutions typically require a supplicant, which is normally configured as an agent or certificate and is installed on a device to provide proof of a device's identity. However, supplicants are not always available and complicate end-point management in highly dynamic or disconnected environments.

Some conventional solutions include systems that monitor traffic flow (e.g., via packet inspection) to detect malicious or suspicious behavior. Then, the systems can make decisions to shunt the malicious device to "honeypots" or "blackholes" for diverting the traffic with respect to the malicious device away from important network elements. For example, "honeypots" are typically created as fake networks such that a malicious device is unaware that it is actually on a fake network. "Blackholes" are typically created such that no response is given back to a malicious device. These solutions are sometimes referred to as "web washers."

However, these known solutions are only able to detect malicious devices after they begin malicious behavior. The detection of these devices is typically based on packet inspection or deep packet inspection. Thus, a bad actor can only be detected once they have initiated an attack, such as by performing network discovery. Also, conventional systems usually do not create honeypots or blackholes until after a malicious device is detected.

Another conventional solution includes using a port security process where access is granted based on a "whitelist" where certain trusted MAC addresses are white-listed. However, port security relying on MAC addresses can be easily defeated by a malicious actor by simply setting a fake MAC address on his or her device that matches the MAC address of a trusted network device currently connected to the network.

Also, an additional conventional solution used in the field of network security include 802.1X implementations, where access and authorization of network devices is based upon an adjudication of a device-supplied "supplicant" and comparing the supplicant with a centralized database of authorizations. However, these 802.1X solutions are only applicable in environments where the end-point devices can support a supplicant and they have access to authorization systems. Also, these systems require constant monitoring and refreshing of the supplicants as they expire. However, this solution does not work in Internet of Things (IoT)-based networks where the end-point devices cannot support supplicants. Also, they do not work in environments with highly tactical or disconnected network environments vary constantly, where verification is required, and/or where access of new devices is highly dynamic. Therefore, there is a need in the field of network security to overcome these deficiencies of the conventional systems and improve network access to prevent malicious devices from causing havoc on networks.

BRIEF SUMMARY

The present disclosure describes implementations of systems, methods, network elements, and non-transitory computer-readable media for creating a secure environment for a network by protecting the network from unwanted network discovery and enumeration of network assets by newly connected devices in the network that have yet to be authenticated. In particular, pre-concocted fake network information may be stored in a network element and provided to a new unknown device when it is first connected in the network and before any authentication processes can be performed. Thus, it is the intention to deceive any newly connected device by provided fake information and withholding the actual network information until after it is determined that the new device is authenticated to operate on the network.

A network element arranged in a communication network, according to one implementation, includes an interface device configured to enable communication with an unknown network device. A memory system is configured to store first and second sets of network information. The first set of network information includes fake information about the network and is configured to deceive the unknown network device before a procedure is performed for analyzing the authentication of the unknown network device. The second set of network information includes real information about the network.

Furthermore, the network element in this implementation may include a processing device and the memory system may be configured to store computer logic having instructions that, when executed, enable the processing device to provide the first set of network information to the unknown network device via the interface device before performing the procedure for analyzing the authentication of the unknown network device. For example, providing the first set of network information may be configured to prevent the unknown network device from obtaining the second set of network information before analyzing the authentication of the unknown network device to thereby protect the network from network discovery or enumeration of network assets.

In response to determining that the unknown network device is authenticated for operation on the network and is thereby a trusted device, the processing device may be configured to negate the first set of network information on the trusted device and provide the second set of network information to the trusted device. Negating the first set of network information may include resetting a port of the interface device in communication with the trusted device to force the trusted device to discover the real information about the network.

In response to determining that the unknown network device is not authenticated for operation on the network and is thereby an untrusted device, the instructions may further enable the processing device to detect when the untrusted device attempts to perform network discovery or enumeration of network assets. In response to detecting that the untrusted device attempts to perform network discovery or enumeration of network assets, the processing device may be configured to perform one or more actions including: a) generating an alert to expose the presence of the untrusted device, b) concocting fake virtual hosts matching the first set of network information, c) disconnecting the untrusted device from the network, d) monitoring further activity of the untrusted device, and e) performing a pseudo password procedure with the untrusted device. The processing device may also be configured to detect authenticity of the unknown network device with neither a supplicant nor a whitelist.

The first and second sets of network information may include link layer data for processing with respect to Layer 2 of the network. The link layer data may include first and second Address Resolution Protocol (ARP) tables representing the first and second sets of network information, respectively. The first ARP table may include Media Access Control (MAC) addresses of fake devices and the second ARP table may include MAC addresses of real devices. The MAC addresses of the first ARP table may be configured to point to a plurality of fake virtual machines.

The first and second sets of network information may also include network layer data for processing with respect to Layer 3 of the network. The network layer data may include fake network topology and connectivity information representing the first set of network information and may further include real network topology and connectivity information representing the second set of network information. The first set of network information may be readily available to a plurality of unknown network devices that are newly connected in the network.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1A:
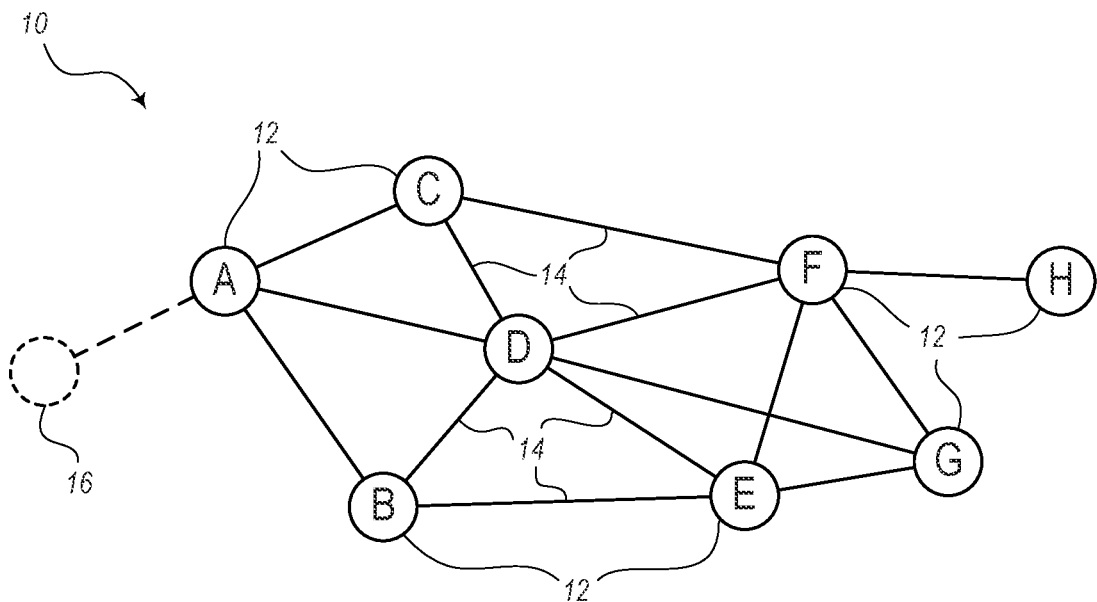
FIG. 1A is a diagram illustrating a multi-node network in which network layer or Layer 3 network topology and routing information can be transmitted, according to various embodiments.

The present disclosure relates to systems and methods for providing network security. More particularly, the present disclosure is configured to protect a network from malicious activity by thwarting efforts by malicious devices to gain access to the network. The systems and methods of the present disclosure are configured to concoct fake network information that is designed to confuse or deceive a malicious device. In particular, the fake information may be devised with the purpose of intentionally deceiving an adversarial device that is newly connected to the network. This fake information is offered to the adversarial or malicious device as a counterfeit of actual real network data. For instance, when a device is first connected to a network, it may not be known whether this device is a friend or a foe. Thus, the embodiments of the present disclosure initially reveal the fake information to the new device until it can be determined whether or not this device is authenticated to be operating on the network.

When it is detected that the newly connected is a trusted device (e.g., when the device is authenticated), then the fake information can be negated or retracted and the real network information can be provided to the device. Otherwise, if it is determined that the new device is an untrusted device (e.g., when the device is not authenticated), then the systems and methods of the present disclosure can keep up the ruse to continue deceiving the untrusted device. Additional actions can also be taken in response to determining that the new device is untrusted.

Also, the systems and methods of the present disclosure may be configured to store and share fake information related to a link layer (Layer 2) of the network. The fake link layer data may include fake device information and fake Media Access Control (MAC) addresses of these fake devices. Furthermore, the present disclosure may also be configured with respect to network layer (Layer 3) information in the network. In the network layer, the fake information may include fake routing information and/or fake network topology information. In other embodiments, the systems and methods may provide fake information on either or both of the link layer and network layer.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1A is a diagram illustrating an embodiment of a network 10 (or a portion of a network) that includes at least nodes 12 (e.g., network element, switch, router, etc.), which are labelled A-H. Also, nodes 12 are connected to each other in the network 10 via a plurality of links 14 in a certain arrangement that defines the topology of the network 10. As is shown, each node 12 is connected to at least one other node 12. The topology of the multi-node network 10 may be understood as a network layer (Layer 3). Network layer data may include the topology (i.e., how the nodes 12 are connected) as well as routing information (e.g., Shortest Path First (SPF) routes, etc.) For example, a shortest route from node A to node H may include a path from node A to node D to node F to node H. One alternative route may include a path from node A to node B to node D to node E to node G to node F to node H.

In Layer 3, an unknown device 16 may be newly connected to the network 10. In this example, the unknown device 16 may connect to a port on node A. In some cases, the unknown device 16 may attempt to gain access to the network topology and routing data with respect to the network 10. According to the embodiments of the present disclosure, the nodes 12 or network elements may be configured with real and fake information about the network topology and routing data. When the unknown device 16 is first connected to the respective node 12, the node 12 can initially provide the unknown device 16 with the fake information before determining whether the unknown device 16 is trusted or untrusted. Particularly, the level of trust is based on an authentication process for determining whether the unknown device 16 is authenticated to operate on the network 10. If the unknown device 16 is authenticated (and therefore trusted), then the connected node 12 can provide the real information about the network topology and routing data to the trusted device.

Interior Gateway Protocols (IGPs) (e.g., Open Shortest Path First (OSPF), Intermediate System to Intermediate System (IS-IS), etc.) go through a process whereby a neighbor is connected to the network (via an adjacency) and then connectivity and topology information is transferred. However, instead of transferring the information of the actual network (i.e., network 10), the node 12 (e.g., network element) connecting to an unauthenticated device can send the fake network information.

Both OSPF and IS-IS go through a similar process when a new device connects to the network and attempts to form an adjacency:
1. Establish neighbor adjacency
2. Exchange link-state advertisements
3. Build the topology table
4. Execute the SPF algorithm
5. Build the routing table In this scenario of FIG. 1A, the unknown device 16 connects to node A. Both OSPF and IS-IS require some basic configuration in order for either protocol to be active Also, some parameters need to match before both sides can form an adjacency. In the case of OSPF, the protocol must be enabled on the interface to begin sending Hello messages to the well-known multicast address. Node A may assume that the unknown device 16 has some basic knowledge about the correct parameters to set. Otherwise, an adjacency cannot be formed and there would be no way for the unknown device 16 to enumerate the network assets. Also, in the case of OSPF, a specific area can be used so that it gives the appearance that a particular connection into the network is part of a protocol-isolated area. The same technique can also be used in IS-IS by making the connections Level 1 only.

One technique of the present disclosure may include preventing unauthorized devices from connecting at Layer 3 by requiring passwords between neighbors. The technique of using passwords may depend on a level of knowledge to be observed. For instance, the node 12 may be configured to make it as easy as possible for the unknown device 16 to connect, with the intention of observing the behavior of the unknown device once it is connected. Therefore, no password may be required, any password may be accepted, or an easy-to-detect password may be used. Also, the node 12 may be configured with a password with the understanding that the password may have been compromised.

Figure 1B:
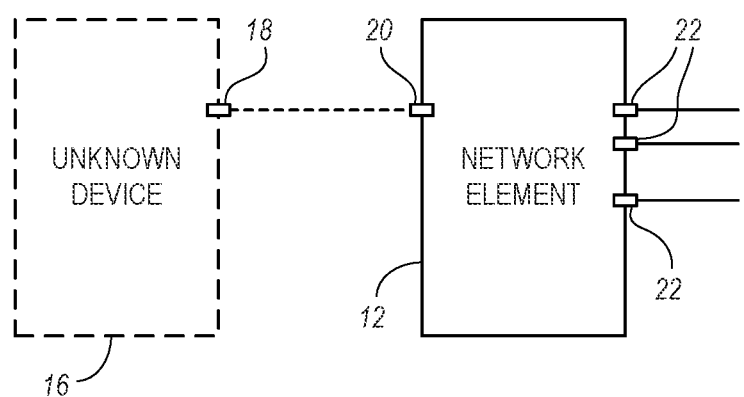
FIG. 1B is a diagram illustrating two adjacent nodes in which link layer or Layer 2 information can be transmitted, according to various embodiments.

FIG. 1B is a diagram illustrating an embodiment of a Layer 2 view of the network 10 of FIG. 1A. In this embodiment, two adjacent nodes (or network elements) are shown whereby an unknown device 16 is newly connected to or is attempting to connect to an established network element or node 12 (e.g., node A shown in FIG. 1A). In particular, the unknown device 16 includes a port 18 for connection with a port 20 of the node 12. The node 12 may also include additional ports 22 configured for connection with one or more real devices. The node 12 may be configured in this respect to store link layer (Layer 2) data regarding links to other devices in the network 10.

Again, according to the embodiments of the present disclosure, the node 12 may be configured to store fake information and real information regarding link layer (Layer 2) data. The node 12 individually presents the fake information, which may include Address Resolution Protocol (ARP) information, such as an ARP table, at Layer 2 to the unknown device 16. The ARP table, in some embodiments, may include Media Access Control (MAC) addresses. The fake information may include fake ARP information, fake ARP tables, fake MAC addresses, etc. Thus, this strategy of providing deceptive information to an unknown device is similar to the techniques performed at Layer 3 leveraging routing protocols as mentioned above with respect to FIG. 1A.

In both the network layer example (Layer 3 of FIG. 1A) and link layer example (Layer 2 of FIG. 1B), similar procedures can be performed to detect whether the unknown device 16 is authenticated, such as by checking information about the unknown device 16 with previously stored authentication information identifying a number of trusted network elements. Once the unknown device 16 is authenticated, the node 12 can then withdraw the fake network information (e.g., fake topology and routing information in Layer 3 and/or fake link layer information in Layer 2) and then advertise the real information (e.g., real topology and routing information in Layer 3 and/or real link layer information in Layer 2). If no authentication takes place (e.g., before authentication happens, if the device cannot be authenticated, etc.), then the node 12 may be configured to monitor the behavior of the unknown device 16 (i.e., the unauthenticated or untrusted device). Also, the node 12 can report any monitored behavioral information to a network manager.

After the neighbor adjacency is established, link-state advertisements communicate the topology of the network. In this technique, a virtual "fake" network will be advertised to the unknown device 16. Also, a process (as described below) including Steps 1-7 can be performed. However, instead of an ARP table (Layer 2), there will be network topology information (Layer 3). The same techniques may be used in both layers, where the node 12 may be configured to move a connecting port to fake devices (Layer 2) or configured to move a connecting port to a fake virtual LAN or routing traffic to a specific safe place (Layer 3).

Once a device is authenticated, the network element can then withdraw the fake routes/topology and/or link information and can then advertise the real network instead. Routes can be withdrawn via the protocol, or the protocol or entire interface can simply be reset.

A similar technique can be used with Border Gateway Protocol (BGP). BGP is a distance-vector protocol, but it requires a TCP connection to form an adjacency. Once formed, an entire fake network can be advertised to the unknown connecting device. Forming a BGP neighbor relationship requires slightly more information than OSPF or IS-IS (i.e., AS number and other parameters). Nevertheless, the same level of untrust can be applied to the connecting device before it is authenticated. As with OSPF and IS-IS, the configuration can require neighbors to produce a password.

Figure 2:
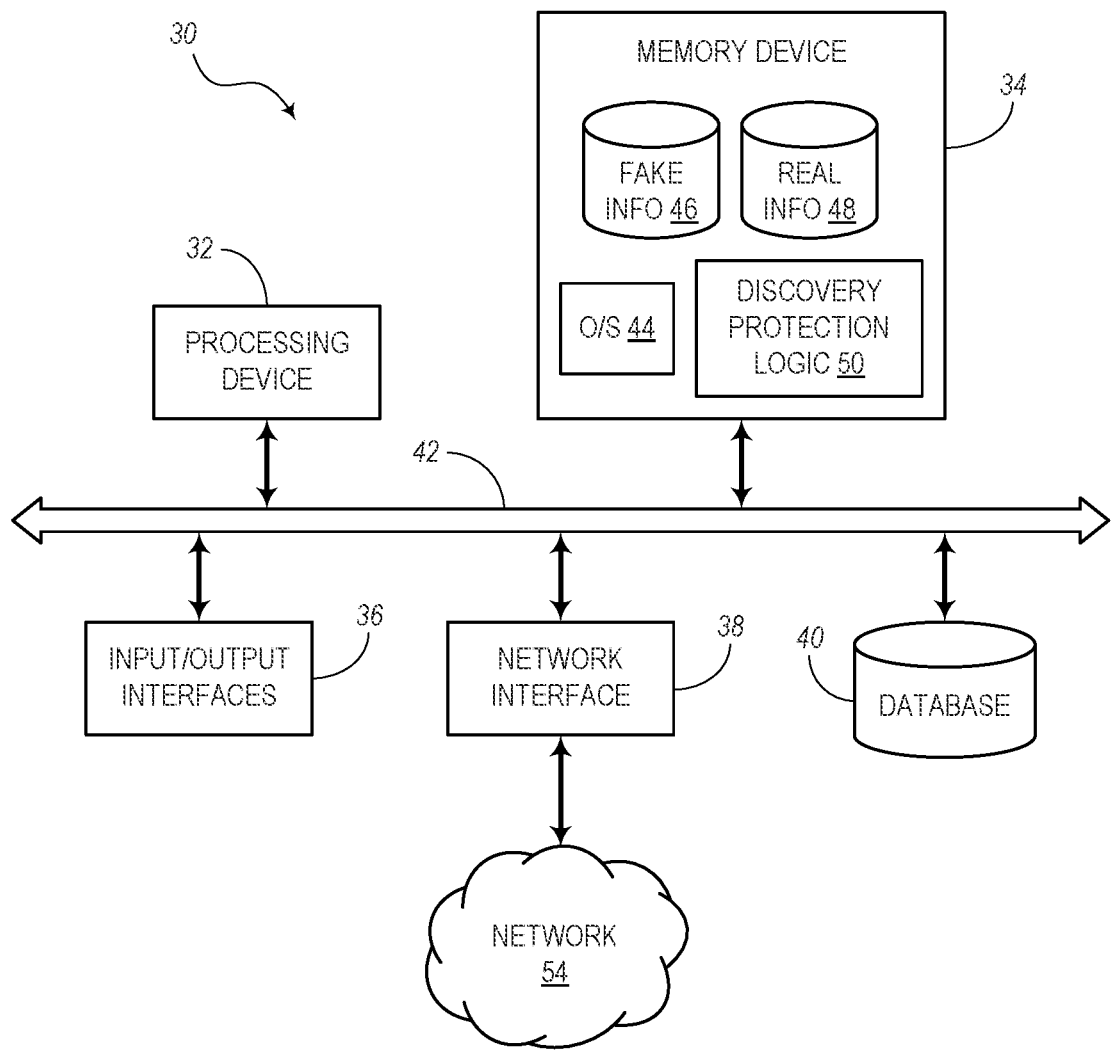
FIG. 2 is a block diagram illustrating a network element configured to protect the network from network discovery by unauthenticated devices, according to various embodiments.

FIG. 2 is a block diagram illustrating an embodiment of a network element 30 (e.g., node 12, switch, router, VNF, etc.) configured to protect a network 54 (e.g., network 10) from network discovery by unauthenticated devices. In the illustrated embodiment, the network element 30 may be a digital computer that, in terms of hardware architecture, generally includes a processing device 32, a memory device 34, Input/Output (I/O) interfaces 36, a network interface 38, and a database 40. The memory device 34 may include a data store, database (e.g., database 40), or the like. It should be appreciated by those of ordinary skill in the art that FIG. 2 depicts the network element 30 in a simplified manner, where practical embodiments may include additional components and suitably configured processing logic to support known or conventional operating features that are not described in detail herein. The components (i.e., 32, 34, 36, 38, 40) are communicatively coupled via a local interface 42. The local interface 42 may be, for example, but not limited to, one or more buses or other wired or wireless connections. The local interface 42 may have additional elements, which are omitted for simplicity, such as controllers, buffers, caches, drivers, repeaters, receivers, among other elements, to enable communications. Further, the local interface 42 may include address, control, and/or data connections to enable appropriate communications among the components 32, 34, 36, 38, 40.

The processing device 32 is a hardware device adapted for at least executing software instructions. The processing device 32 may be any custom made or commercially available processor, a Central Processing Unit (CPU), an auxiliary processor among several processors associated with the network element 30, a semiconductor-based microprocessor (in the form of a microchip or chip set), or generally any device for executing software instructions. When the network element 30 is in operation, the processing device 32 may be configured to execute software stored within the memory device 34, to communicate data to and from the memory device 34, and to generally control operations of the network element 30 pursuant to the software instructions.

It will be appreciated that some embodiments of the processing device 32 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 32 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 36 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 36 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 38 may be used to enable the network element 30 to communicate over a network, such as the network 54, the Internet, a Wide Area Network (WAN), a Local Area Network (LAN), and the like. The network interface 38 may include, for example, an Ethernet card or adapter (e.g., 10 BaseT, Fast Ethernet, Gigabit Ethernet, 10 GbE) or a Wireless LAN (WLAN) card or adapter (e.g., 802.11a/b/g/n/ac). The network interface 38 may include address, control, and/or data connections to enable appropriate communications on the network 54.

The memory device 34 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 34 may incorporate electronic, magnetic, optical, and/or other types of storage media. The memory device 34 may have a distributed architecture, where various components are situated remotely from one another, but can be accessed by the processing device 32. The software in memory device 34 may include one or more software programs, each of which may include an ordered listing of executable instructions for implementing logical functions. The software in the memory device 34 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 34 may include a data store used to store data. In one example, the data store may be located internal to the network element 30 and may include, for example, an internal hard drive connected to the local interface 42 in the network element 30. Additionally, in another embodiment, the data store may be located external to the network element 30 and may include, for example, an external hard drive connected to the Input/Output (I/O) interfaces 36 (e.g., SCSI or USB connection). In a further embodiment, the data store may be connected to the network element 30 through a network and may include, for example, a network attached file server.

Moreover, some embodiments may include a non-transitory computer-readable storage medium having computer readable code stored in the memory device 34 for programming the network element 30 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 32 that, in response to such execution, cause the processing device 32 to perform a set of operations, steps, methods, processes, algorithms, functions, techniques, etc. as described herein for the various embodiments.

In addition, according to various embodiments of the present disclosure, the memory device 34 may be configured to store an Operating System (O/S) 44, fake information 46, real information 48, and discovery protection logic 50. In some cases, the discovery protection logic 50 may be referred to as an anti-enumeration engine. The O/S 44, fake information 46, and real information 48 may be stored in the memory device 34 and/or the database 40. The discovery protection logic 50 may be stored as software or firmware in the memory device 34, may be configured as hardware on the processing device 32, or may include any combination of hardware, software, and firmware. In some embodiments, the discovery protection logic 50 may be incorporated in the O/S 44. Therefore, the network element 30 may be configured as an orchestration system or may be in communication with an orchestration or management system for communicating control procedures and for reporting traffic and behavior data of an untrusted device.

In operation, the discovery protection logic 50 may be stored on a non-transitory computer-readable medium (e.g., memory device 34, database 40, etc.) and may be configured to enable the processing device 32 to perform certain functions for protecting the network 54 from network discovery by an unknown, unauthenticated, or untrusted device. By preventing network discovery by a malicious device, the discovery protection logic 50 can thwart the efforts of the malicious device by providing the fake information 46 initially to any newly connected devices and to continue to provide the fake information 46 to malicious devices when it is determined that the newly connected device is not authenticated or is untrustworthy. However, if it is determined that the newly connected device is authenticated to operate on the network 54, the discovery protection logic 50 may be configured to provide retract the fake information 46 and provide the real information 48 instead. It should be noted that providing the real information 48 is performed only after an authentication process.

The network element 30 (e.g., switch, router, Virtual Network Function (VNF), etc.) may utilize the capabilities of the O/S 44 or discovery protection logic 50 to create, host, and broadcast an entirely fake ARP table (e.g., from the fake information 46) to any newly connected and unauthenticated device. If the device is malicious, this fake ARP table will bait the adversary into doing network discovery assuming that it has valid network connectivity. The network element 30 will maintain two separate ARP tables, where the first table is the fake ARP table that may be stored with the fake information 46 and the second table is the real ARP table that may be stored with the real information 48.

The network element 30 may be configured to maintain the fake ARP table (and other fake information 46) in the same manner as the real ARP table (and other real information 48). To further enhance the veracity of the fake ARP table, the discovery protection logic 50 or O/S 44 may be configured to enable the processing device 32 to host multiple lightweight virtual systems via a virtual function. For example, the discovery protection logic 50 may be configured to create, spin up, or concoct virtual hosts that match the fake dynamic ARP table. This can be done to establish or justify fake network information (also referred to as a "honeypot"). The combination of the fake ARP table (e.g., fake information 46) and virtual targets may be designed for deception. The fake ARP table can be populated using the MAC addresses of these fictitious virtual systems to conduct the honeypot technique. The real information 48 includes the real ARP table regarding actual device information for the network 54. The trusted ARP table (e.g., real information 48) may only be advertised to the new device once it has been authenticated. This process may proceed as follows:

1. A new device (e.g., unknown device 16) connects to an interface (e.g., port 20, network interface 38, etc.) on the network element 30.

2. The discovery protection logic 50 and/or O/S 44 of the network element 30 presents the fake ARP table (e.g., fake information 46) to the new device.

3. The discovery protection logic 50 and/or O/S 44 begins an interrogation of the new device. If the MAC address, IP address, hostname, and/or traffic characteristics match authorized data (e.g., stored in database 40), the port 20 (or network interface 38) resets to allow the new device to rediscover the assets with the real ARP table (e.g., real information). The authorization data may be stored in database 40, which could be locally hosted. In some embodiments, access to the authorization data may include a call to authorized source systems of records (e.g., directory services, Configuration Management Database (CMDB), or the like) for validation.

4. When the new device is found to be a trusted device, the trusted device will rediscover the true devices and normal operations will continue.

5. If the MAC, IP, hostname, and/or traffic characteristics fail to match the authorized database, the new device is found to be an untrusted device and continues to receive the fake ARP table.

6. If the untrusted device attempts to enumerate the fake network assets, it will continue to "see" the fake ARP table and the following actions may be executed by the discovery protection logic 50:
   a. Generate a custom alert.
   b. Capture traffic to the untrusted device for a short length of time (e.g., about 90 seconds).
   c. Move the port connection of the port 20 to a fake virtual LAN (Layer 2) and/or route traffic to a fake node along a fake path (Layer 3).
   d. Create (spin up, concoct, etc.) virtual hosts that match the fake dynamic ARP table to establish (or justify) the honeypot (e.g., fake network, node, path, etc.).
   e. Forward traffic to the fake virtual assets hosted in the fake virtual environment (e.g., VNF, container, or the like).

7. The network element 30 (or related orchestration system) may utilize the discovery protection logic 50 to apply new controls to the network interface 38 to either direct the untrusted device to a full honeypot network, disconnect the untrusted device, or let the untrusted device continue to operate with the fake information 46.

Figure 3A:
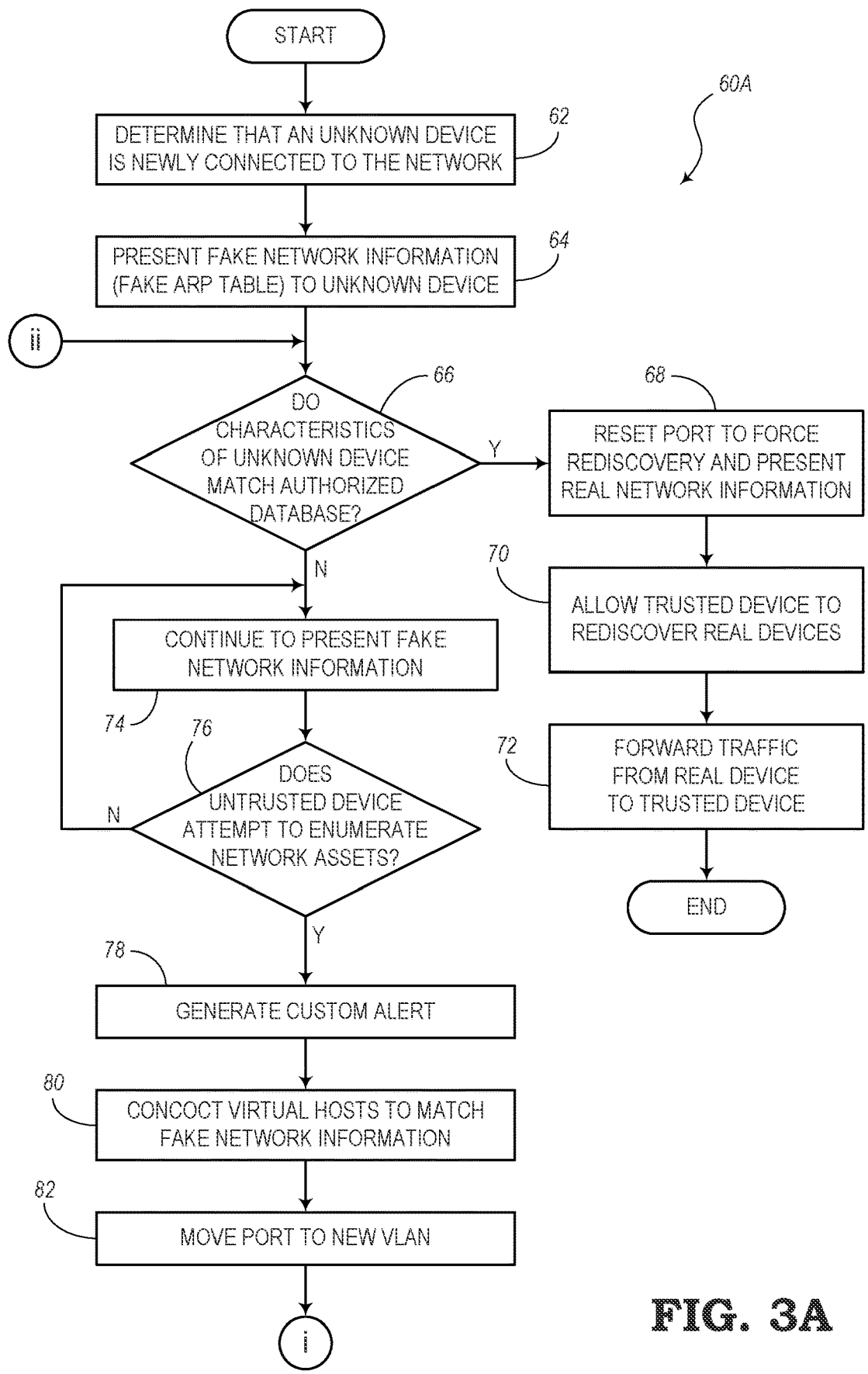
FIGS. 3A and 3B are combined to form a flow diagram illustrating a process executed by the network element of FIG. 2 for preventing network discovery by untrusted devices, according to various embodiments.
Figure 3B:
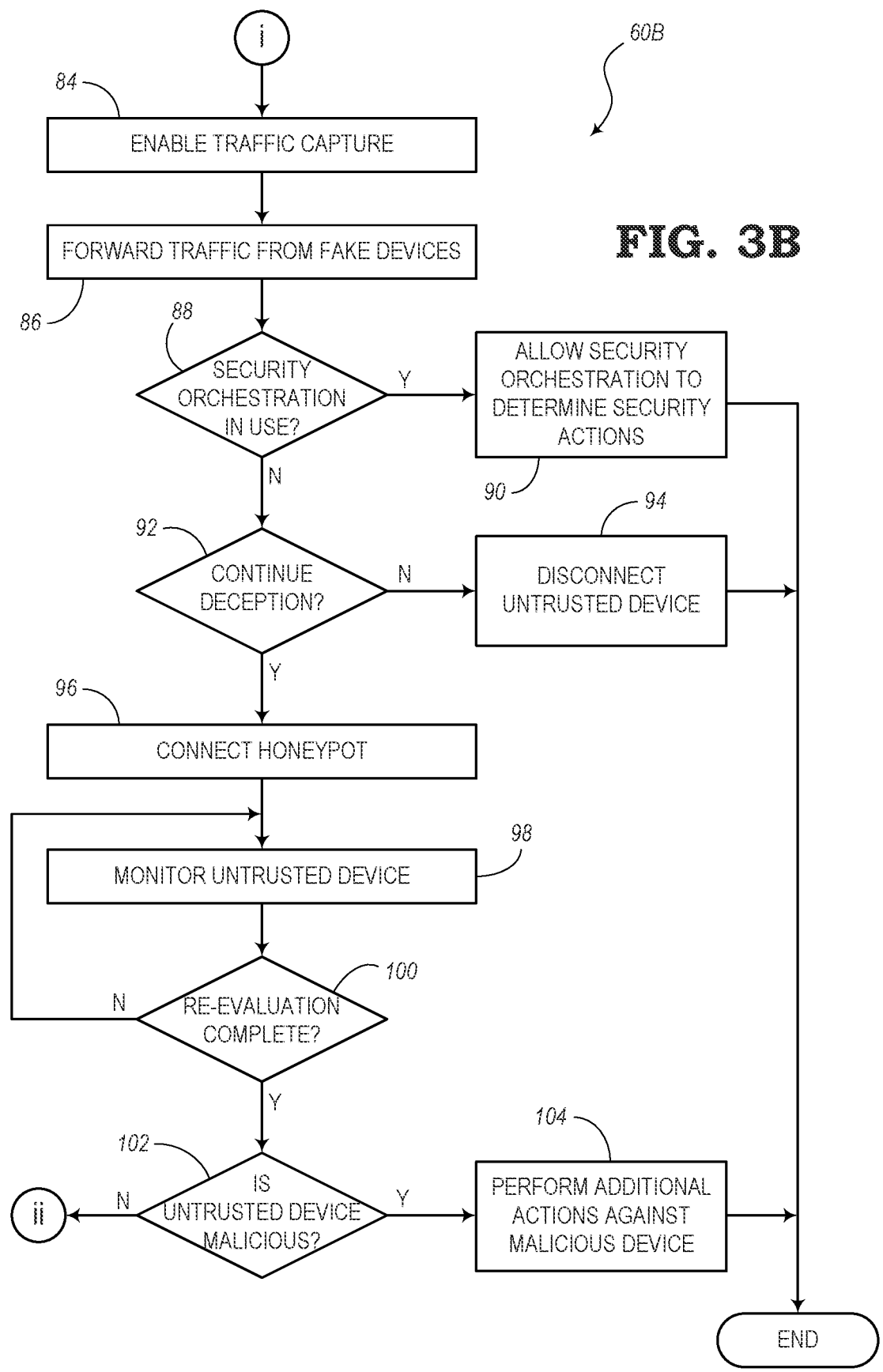

FIGS. 3A and 3B are combined to form a flow diagram illustrating an embodiment of a process 60 (i.e., including portion 60A shown in FIG. 3A and portion 60B shown in FIG. 3B) that may be executed by the network element 30 of FIG. 2, such as by utilizing the discovery protection logic 50. The process 60 is configured to enable the network element to prevent network discovery by untrusted devices. In this embodiment, the process 60 includes detecting when a new device is connected to an interface of the monitoring network element, as indicated in block 62. The process 60 also includes presenting fake information to the new device, as indicated in block 64.

The process 60 then includes determining whether characteristics of the new device match an authorized database, as analyzed in decision block 66. If the new device is determined to be an authorized or trusted device, then the process 60 proceeds to block 68, which includes the step of resetting a connecting port to force the new device to perform a rediscovery and then presenting the real (true) information (e.g., real MAC address table). Also, block 70 includes the step of allowing the trusted device to rediscover the real devices in the network. Block 72 includes the step of forwarding traffic between the trusted device and the real devices (hosts).

If it is determined in decision block 66 that the characteristics do not match the authorized database, then the process 60 determines that the new device is an unauthorized or untrusted device and proceeds instead to block 74. As indicated in block 74, the process 60 includes the step of continuing to present the fake information (e.g., fake ARP table) to the untrusted device. The process 60 further includes determining whether the untrusted device attempts to enumerate (discover) network assets (e.g., the fake network devices originally offered to the new unknown device), as indicated in decision block 76. If no attempt is made, the process 60 loops back to block 74 to continue presenting the fake information. However, if such an attempt is detected in decision block 76, then the process 60 goes to block 78.

Upon detection that the untrusted device attempts to perform discovery, the process 60 may be configured to perform one or more responsive actions. For example, the process 60 may include generating a custom alert, as indicated in block 78, based on information obtained from the untrusted device. The process 60 may also include the step of concocting fake virtual devices to match the fake ARP table and a fake virtual LAN (VLAN), as indicated in block 80. Also, the connecting port may be moved for connection to the fake VLAN, as indicated in block 82. Then, the process 60 includes enabling traffic to these fake components to capture traffic characteristics, as indicated in block 84, so as to gather information about the untrusted device. Also, the process 60 may include forwarding "traffic" from these fake hosts to the untrusted device, as indicated in block 86.

After these steps, the process 60 further includes determining whether security orchestration is in use, as indicated in decision block 88. If security orchestration is in use, the process 60 proceeds to block 90, which includes the step of allowing the security orchestration to determine certain security actions to perform. With no security orchestration at this point, the process 60 goes to decision block 92, which includes the step of determining if the deception is to be continued. If not, the process 90 includes disconnecting the untrusted device (block 94) and ends. If the deception is to continue, the process 90 proceeds to block 96, which includes the step of connecting to the honeypot (if the honeypot is not already connected). Also, the process 60 includes monitoring various characteristics (e.g., traffic) of the untrusted device, as indicated in block 98.

Next, the process 60 includes determining whether a re-evaluation procedure of the untrusted device is complete, as indicated in decision block 100. If not, the process 60 loops back to block 98 to continue to monitor the untrusted device. However, if re-evaluation is complete, the process 60 proceeds to decision block 102, which includes the step of determining whether the untrusted device is a malicious device based on the evaluation of the untrusted device. If not, the process 60 may return back to decision block 66 to begin evaluations of the untrusted device again. It may be assumed at this point that there is still a possibility that the untrusted device is not malicious. If it is malicious, the process 60 may be configured to perform other actions against the malicious device as needed, as indicated in block 104. After these further actions, the process 60 may end.

Figure 4A:
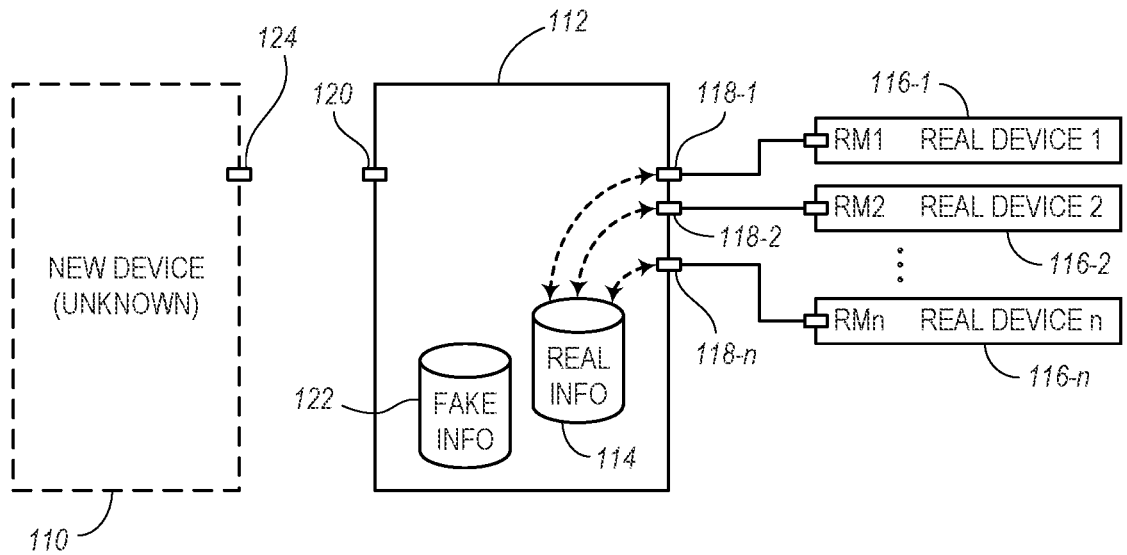
FIG. 4A is a block diagram illustrating an initial state of a network element before it is connected to an unknown device, according to various embodiments.

FIGS. 4A-4D show a number of conditions of a connection between a new device 110 and a network element 112 that is already established in a network. FIG. 4A is a block diagram illustrating an initial state of the network element 112 before it is connected to the new device 110 when is considered to be an unknown device. The network element 112, according to various embodiments of the present disclosure, includes a first memory element 114 configured for storing real information about the real devices 116-1, 116-2, . . . , 116-n. For example, the first memory element 114 may include a MAC address table that points to the real devices 116-1, 116-2, . . . , 116-n. The network element 112 includes ports 118-1, 118-2, . . . , 118-*n* connected to real devise 116-1, 116-2, . . . , 116-*n*, respectively. The real MAC addresses stored in the first memory element 114 may include RM1 representing the MAC address of the real device 116-1, RM2 representing the MAC address of the real device 116-2, . . . , and RMn representing the MAC address of the real device 116-*n*. The network element 112 includes another port 120 configured for connection with an unknown device (e.g., new device 110).

In addition, the network element 112 also includes a second memory element 122, which is configured to store fake information (e.g., fake MAC address table) pointing to fake devices. For example, FM1 may represent a fake MAC address of a first fake device, FM2 may represent a fake MAC address of a second fake device, . . . , and FMn may represent a fake MAC address of an nth fake device. In some embodiments, the network element 112 may also create or concoct fake VNFs or other virtual machines for representing pseudo devices intended to appear as real device to an unknown or untrusted device (e.g., new device 110). In alternative embodiments, the network element 112 may concoct these pseudo devices at a later time, such as when an untrusted device actually tries to perform discover of network resources.

Figure 4B:
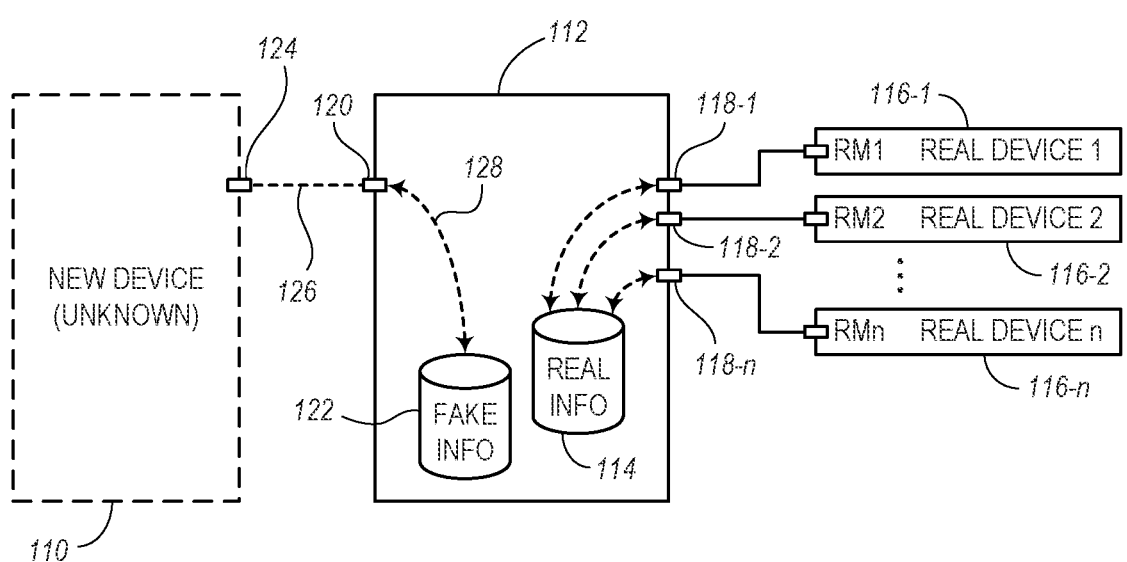
FIG. 4B is a block diagram illustrating another state of the network element shown in FIG. 4A when the unknown device is first connected to the network element, according to various embodiments.

FIG. 4B is a block diagram showing another condition where the new device 110 (e.g., unknown device) is initially connected to the network element 112. In particular, a port 124 of the new device 110 is connected to the port 120 of the network element 112 via a transmission medium 126 (e.g., link). When the network element 112 determines initially that the new device 110 is connected to port 120 and the new device 110 is unknown at this point, then the network element 112 is configured to connect the port to the second memory element 120 via a configurable link 128. Again, the initial set-up includes connecting port 120 to the second memory element 122 using the configurable link 128 to provide the fake information to the new device 110. At this stage, the network element 112 may be configured to analyze the activities of the new device 110 (unknown at this time) to determine if the new device 110 is authenticated and/or if the new device 110 attempt to enumerate the network resources before an authentication process is performed. Based on the results of this analysis, the network element 112 is configured to proceed with respect to FIG. 4C if the new device 110 is authenticated and to proceed with respect to FIG. 4D if the new device 110 is not authenticated.

Figure 4C:
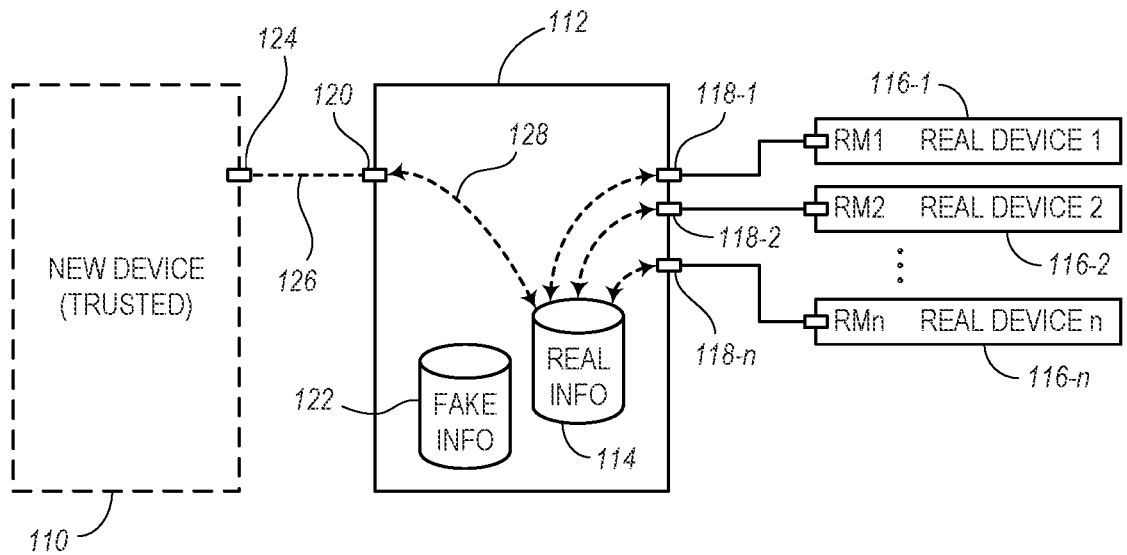
FIG. 4C is a block diagram illustrating yet another state of the network element shown in FIG. 4A when the unknown device is detected to be a trusted device, according to various embodiments.

FIG. 4C shows the state where the new device 110 (previously the "unknown device" with respect to FIGS. 4A and 4B) is detected to be a trusted or authenticated device. In this case, the network element 112 moves the configurable link 128 from the fake information in the second memory element 122 to the real information in the first memory element 114. Thus, the new device 110 (trusted at this point) will have access to the real data via the port 120 and the new device 110 is configured to perform normal network operations. This state represents when characteristics of the new device 110 match authorized data in a database.

Figure 4D:
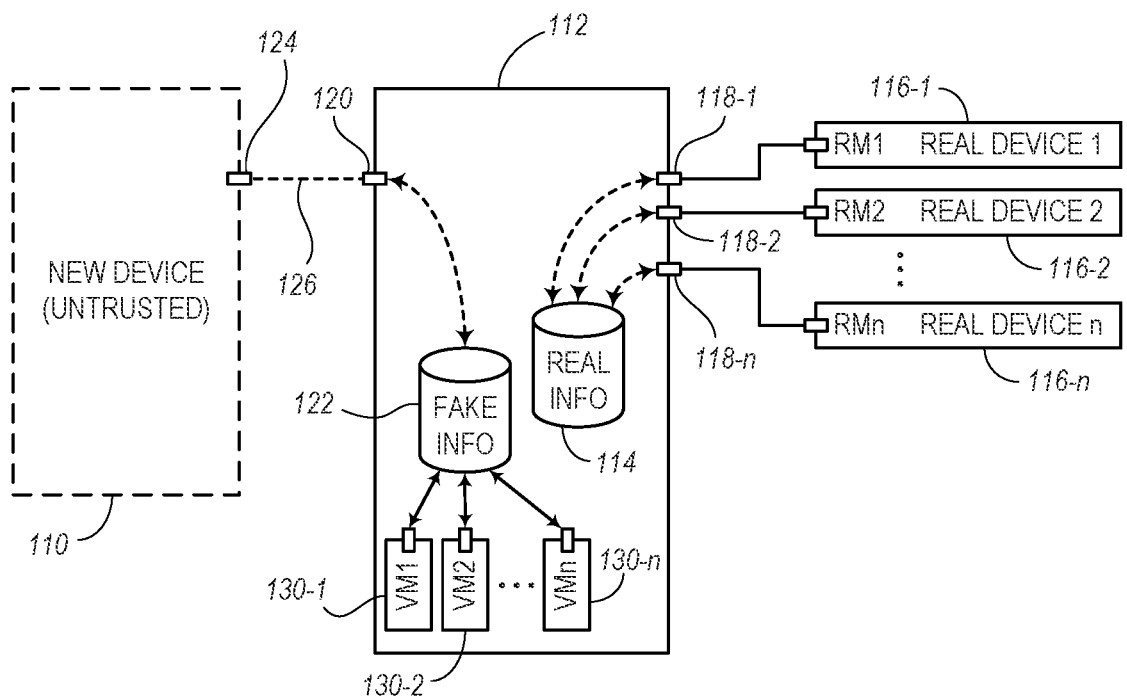
FIG. 4D is a block diagram illustrating still another state of the network element shown in FIG. 4A when the unknown device is detected to be an untrusted device, according to various embodiments.

FIG. 4D, however, is a state of the network element 112 when the new device 110 is determined to be untrusted or unauthenticated and is unable to gain access to real information in the first memory element 114. Instead, the configurable link 128 remains connected to the second memory element 122 for providing the untrusted new device 110 with the fake information. If the new device 110 (untrusted) attempts to enumerate the network information before authentication (or when found to be unauthorized), the network element 112 may be configured to spin up or concoct fake information VM1, VM2, . . . , VMn configured to represent fake network assets 130-1, 130-2, . . . , 130-*n*. The fake information VM1, VM2, . . . , VMn may be created to correspond with the fake information (e.g., fake MAC addresses FM1, FM2, . . . , FMn) in the second memory element 122 to keep up the deception. In some embodiments, as mentioned above, this concocted system of fake virtual assets may be created ahead of time (e.g., before the new device 110 is connected to the network element 112 as shown in FIG. 4A).

Figure 5:
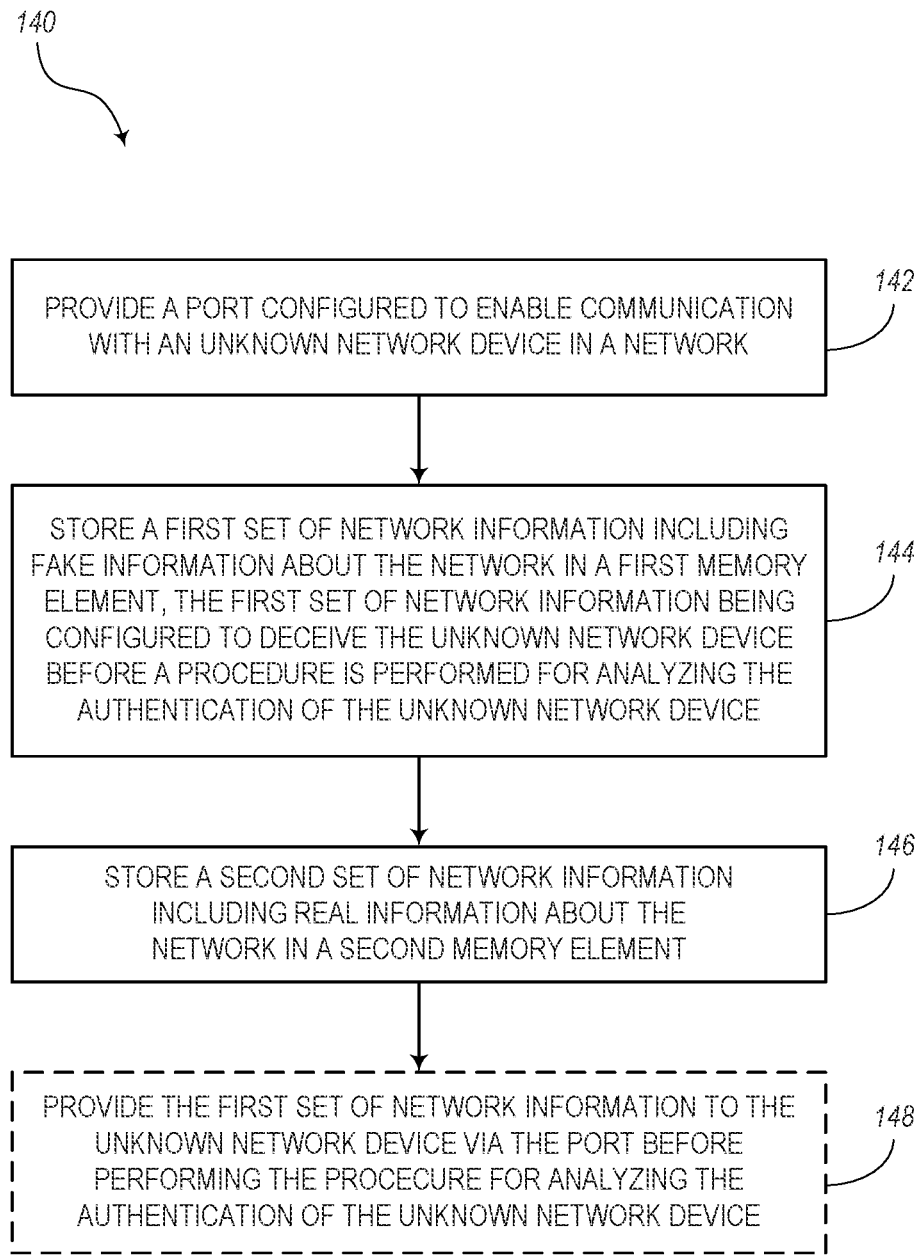
FIG. 5 is a flow diagram illustrating a general process for protecting a network from network discovery by an unauthenticated network device, according to various embodiments.

FIG. 5 is a flow diagram illustrating an embodiment of a general process 140 for protecting a network from network discovery by an unauthenticated network device. In this embodiment, the process 140 includes a step of providing a port configured to enable communication with an unknown network device in a network, as indicated in block 142. The process 140 also includes storing a first set of network information including fake information about the network in a first memory element, as indicated in block 144, wherein the first set of network information is configured to deceive the unknown network device before a procedure is performed for analyzing the authentication of the unknown network device. Also, the process 140 includes the step of storing a second set of network information including real information about the network information in a second memory element, as indicated in block 146. In some embodiments, the process 140 may also include the step of providing the first set of network information to the unknown network device via the port before performing the procedure for analyzing the authentication of the unknown network device, as indicated in block 148.

According to additional embodiments, the process 140 may be further defined whereby providing the first set of network information may be configured to prevent the unknown network device from obtaining the second set of network information before analyzing the authentication of the unknown network device to thereby protect the network from network discovery or enumeration of network assets. In response to determining that the unknown network device is authenticated for operation on the network and is thereby a trusted device, the process 140 may also include negating the first set of network information on the trusted device and providing the second set of network information to the trusted device. For example, negating the first set of network information may include resetting a port of the port in communication with the trusted device to force the trusted device to discover the real information about the network. In response to determining that the unknown network device is not authenticated for operation on the network and is thereby an untrusted device, the process 140 further includes detecting when the untrusted device attempts to perform network discovery or enumeration of network assets. In response to detecting that the untrusted device attempts to perform network discovery or enumeration of network assets, the process may include perform one or more actions including: a) generating an alert to expose the presence of the untrusted device, b) concocting fake virtual hosts matching the first set of network information, c) disconnecting the untrusted device from the network, d) monitoring further activity of the untrusted device, and e) performing a pseudo password procedure with the untrusted device. The process 140 may detect authenticity of the unknown network device with neither a supplicant nor a whitelist.

In some embodiments, the first and second sets of network information may include link layer data for processing with respect to Layer 2 of the network. The link layer data may include first and second Address Resolution Protocol (ARP)

tables representing the first and second sets of network information, respectively. The first ARP table may include Media Access Control (MAC) addresses of fake devices and the second ARP table may include MAC addresses of real devices. The MAC addresses of the first ARP table may be configured to point to a plurality of fake virtual machines.

Furthermore, the first and second sets of network information in process 140 may include network layer data for processing with respect to Layer 3 of the network. The network layer data may include fake network topology and connectivity information representing the first set of network information and may further include real network topology and connectivity information representing the second set of network information. The first set of network information may be readily available to a plurality of unknown network devices that are newly connected in the network.

Therefore, the systems and methods of the present disclosure may include features that are advantageous with respect to conventional systems. For example, by establishing a memory with fake network information that is initially available to a newly connected device, the present disclosure is able to protect the network from network discovery from all new devices before any authentication processes are conducted. This is different from conventional honeypot solutions in that traffic monitoring of regular operations is not needed. Rather, the systems and methods of the present disclosure focus on initial protection while authentication is yet to be done.

Also, the present disclosure establishes two sets of network information, unlike conventional systems, where the first set including fake information and the other including real information. The pre-established first set of fake information is configured to confuse an adversary at the beginning. The information may include MAC address tables, where Network Operating System (NOS) code may be configured to present the two sets of information (e.g., fake and real ARP tables) to a newly connected device based on the level of trust that can be given to the newly connected device based on authentication processes. In some embodiments, a dynamically created set of VNFs (e.g., Virtual Machine (VM), container, etc.) may present fake assets matching fake ARP table information to untrusted connected devices.

In addition, conventional systems may require the use of a supplicant, authenticator, and authentication server for operation under IEEE 802.1X. However, the embodiments described with respect to the present disclosure do not require a supplicant. Also, the present embodiments do not dependent upon whitelisted MAC addresses to make access decisions. Thus, with a new device gaining access to information (e.g., the deceptive information), the embodiments of the present disclosure may cause a new device to let down its guard to thereby entice the new unknown, unauthorized devices to expose their presence. By presenting the fake MAC table, the network element of the present disclosure can detect when a malicious device has begun performing an attack (e.g., asset scanning) without exposing real assets to the malicious device. This arrangement reduces the risk on a production network compared to known solutions since real assets are never exposed to unknown devices.

With regard to OSPF, techniques for analyzing optimum routes may include listening to IGP link state updates and then building a picture of the network based on that. The analysis of optimal routes may include listening without talking. If Link-State Advertisements (LSAs) were generated, the present systems could begin advertising any fake topology information. This could include a fictional network behind the device, or it could disrupt the existing, valid network. Route reflection techniques with BGP could include a source of routing information that elements may trust and use to build their routing databases. One key aspect in both of these scenarios is the trust between the speaker and the listener, in that the listener accepts what the speaker is saying.

The systems and methods of the present disclosure may be configured to follow all applicable standards and RFCs in order that no interoperability issues will arise. However, there are some embodiments in which the systems and methods may follow the standards and RFCs, but then using different data formats and/or procedures.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A network element arranged in a network, the network element comprising:
   an interface device configured to enable communication with an unknown network device,
   a memory system configure to store first and second sets of network information and computer logic having instructions for programming a processing device,
   wherein the first and second sets of network information include link layer data for processing with respect to Layer 2 of the network, including Address Resolution Protocol (ARP) tables and Media Access Control (MAC) addresses,
   wherein the first set of network information includes fake information about the network, including a fake ARP table and fake MAC addresses, and is configured to deceive the unknown device before a procedure is performed for analyzing authentication of the unknown network device, wherein the fake MAC addresses and the fake ARP table are configured to point to a plurality of fake virtual machines that represent fake network assets such that the unknown network device is configured to communicate with the plurality of fake virtual machines, for deception, until the authentication of the unknown network device,
   wherein the second set of network information includes real information, including a real ARP table and real MAC addresses, about the network,
   wherein, in response to determining that the unknown network device is not authenticated for operation on the network and is thereby an untrusted device, the instructions enable the processing device to detect when the untrusted device attempts to perform network discovery or enumeration of network assets, and
   wherein, in response to detecting that the untrusted device attempts to perform network discovery or enumeration of network assets, the instructions further enable the processing device to perform one or more actions including: a) generating an alert to expose a presence of the untrusted device, b) concocting fake virtual hosts matching the first set of network information, c) disconnecting the untrusted device form the network, d)

monitoring further activity of the untrusted device, and
e) performing a pseudo password procedure with the untrusted device.

2. The network element of claim 1, wherein the instructions that, when executed, enable the processing device to provide the first set of network information to the unknown network device via the interface device before performing the procedure for analyzing the authentication of the unknown network device.

3. The network element of claim 2, wherein providing the first set of network information is configured to prevent the unknown network device from obtaining the second set of network information before the analyzing the authentication of the unknown network device to thereby protect the network from network discovery or enumeration of network assets.

4. The network element of claim 2, wherein, in response to determining that the unknown network device is authenticated for operation on the network and is thereby a trusted device, the instructions further enable the processing device to negate the first set of network information on the trusted device and provide the second set of network information to the trusted device.

5. The network element of claim 4, wherein negating the first set of network information includes resetting a port of the interface device in communication with the trusted device to force the trusted device to discover the real information about the network.

6. The network element of claim 2, wherein the instructions further enable the processing device to detect authenticity of the unknown network device with neither a supplicant nor a whitelist.

7. The network element of claim 1, wherein the first and second sets of network information include network layer data for processing with respect to Layer 3 of the network.

8. The network element of claim 7, wherein the network layer data includes fake network topology and connectivity information representing the first set of network information and further includes real network topology and connectivity information representing the second set of network information.

9. The network element of claim 1, wherein the first set of network information is readily available to a plurality of unknown network devices that are newly connected in the network.

10. The network element of claim 1, wherein the plurality of fake virtual machines are created prior to the unknown network device requesting authentication.

11. The network element of claim 1, wherein, subsequent to the authentication of the unknown network device, the network element is configured to withdraw the fake information from the unknown network device and advertise the real information thereto.

12. A non-transitory computer-readable medium configured to store computer logic having instructions that, when executed, cause one or more processing devices to:
enable communication with unknown network device in a network via a port,
store a first set of network information including fake information about the network in a first memory element, the first set of network information being configured to deceive the unknown network device before a procedure is performed for analyzing authentication of the unknown network device,
store a second set of network information including real information about the network in a second memory element, wherein the first and second sets of network information include link layer data for processing with respect to Layer 2 of the network, including Address Resolution Protocol (ARP) tables and Media Access Control (MAC) addresses, wherein the fake information includes a fake ARP table and fake MAC addresses, and wherein the real information includes a real ARP table and real MAC addresses,
wherein the fake MAC addresses and the fake ARP table are configured to point to a plurality of fake virtual machines that represent fake network assets such that the unknown network device is configured to communicate with the plurality of fake virtual machines, for deception, until the authentication of the unknown network device,
in response to a determination that the unknown network device is not authenticated for operation on the network and is thereby an untrusted device, detect when the untrusted device attempts to perform network discovery or enumeration of network assets, and
in response to the detection that the untrusted device attempts to perform network discovery or enumeration of network assets, perform one or more actions including: a) generating an alert to expose a presence of the untrusted device, b) concocting fake virtual hosts matching the first set of network information, c) disconnecting the untrusted device from the network, d) monitoring further activity of the untrusted device, and e) performing a pseudo password procedure with the untrusted device.

13. The non-transitory computer-readable medium of claim 12, wherein the instructions further cause the one or more processing devices to provide the first set of network information to the unknown network device via the port before performing the procedure for analyzing the authentication of the unknown network device.

14. The non-transitory computer-readable medium of claim 12, wherein, in response to determining that the unknown network device is authenticated for operation on the network and is thereby a trusted device, the instructions further cause the one or more processing devices to negate the first set of network information on the trusted device and provide the second set of network information to the trusted device, and wherein, in response to determining that the unknown network device is not authenticated for operation on the network and is thereby an untrusted device, the instructions further cause the one or more processing devices to detect when the untrusted device attempts to perform network discovery or enumeration of network assets.

15. A method comprising the steps of:
enabling communication with an unknown network device in a network via a port,
storing a first set of network information including fake information about the network in a first memory element, the first set of network information being configured to deceive the unknown network device before a procedure is performed for analyzing authentication of the unknown network device,
storing a second set of network information including real information about the network in a second memory element, wherein the first and second sets of network information include link layer data for processing with respect to Layer 2 of the network, including Address Resolution Protocol (ARP) tables and Media Access Control (MAC) addresses, wherein the fake information includes a fake ARP table and fake MAC addresses, and wherein the real information includes a real ARP table and real MAC addresses, wherein the fake MAC addresses and the fake ARP table are configured to point to a plurality of fake virtual machines that represent fake network assets such that the unknown network device is configured to communicate with the plurality of fake virtual machines, for deception, until the authentication of the unknown network device, in response to determining that the unknown network device is not authenticated for operation on the network and is thereby an untrusted device, detecting when the untrusted device attempts to perform network discovery or enumeration of network assets, and in response to detecting that the untrusted device attempts to perform network discovery or enumeration of network assets, performing one or more actions including: a) generating an alert to expose a presence of the untrusted device, b) concocting fake virtual hosts matching the first set of network information, c) disconnecting the untrusted device from the network, d) monitoring further activity of the untrusted device, and e) performing a pseudo password procedure with the untrusted device.

16. The method of claim 15, further comprising the step of providing the first set of network information to the unknown network device via the port before performing the procedure for analyzing the authentication of the unknown network device.

* * * * *